UNITED STATES PATENT OFFICE 2,524,524

SULFONATED CARBAZOL DERIVATIVES OF THE ANTHRAQUINONE SERIES AND A PROCESS FOR THEIR PREPARATION

Ernst Gutzwiller, Basel, Switzerland, assignor to Sandoz Limited, Basel, Switzerland, a Swiss firm No Drawing. Application December 22, 1948, Serial No. 66,848. In Switzerland December 29, 1947

8 Claims. (Cl. 260—316)

The present invention relates to new sulfonated carbazol derivatives of the anthraquinone series which are very valuable dyestuffs for animal fibres and to a process for their manufacture.

I have found that new water-soluble brown-yellow to brown-colored dyestuffs of the anthraquinone carbazol series can be obtained by treating a 1-acyl-aminoanthraquinone derivative of the general formula

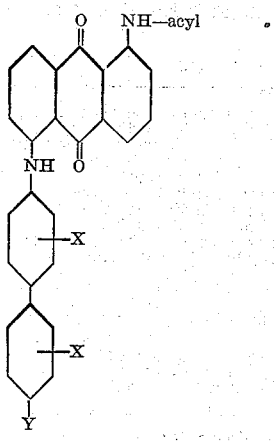

wherein X stands for a substituent like hydrogen, halogen, alkyl or O-alkyl and Y stands for a substituent like hydrogen, alkyl, halogen or acylamino, with a sulfonating agent.

The new sulfonated dyestuffs derive from an anthraquinone carbazol compound of the general formula

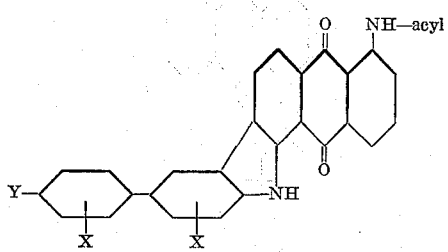

wherein X stands for hydrogen, halogen, alkyl or alkoxy and Y stands for hydrogen, alkyl, halogen or acylamino, and possess one to three sulfonic acid groups.

They are soluble in concentrated sulphuric acid with a blue coloration and dye wool, leather, superpolyamides and natural silk in very fast brown-yellow to brown shades. As compared to the anthraquinone carbazol dyestuffs, the manufacture of which is described in U. S. Patent 2,093,355, the new dyestuffs possess generally yellower shades and better fastness properties. As starting material for the manufacture of the new dyestuffs there may be used 1-acylaminoanthraquinones containing in 5-position the aminodiphenyl, 4-amino-4'-chlorodiphenyl or 4-amino-4'-methyldiphenyl radicals or the monoacylated derivatives of benzidine, 3,3'-dichlorobenzidine, tolidine, dianisidine, diphenetidine and similar derivatives.

In order to provoke the ring closure and the sulfonation of the said compounds, concentrated sulfuric acid, sulfuric acid monohydrate, fuming sulfuric acid or chlorosulfonic acid or mixtures of these sulfonating agents may be used.

The acylamino radicals which stand in 1-position of the anthraquinone nucleus can be of aliphatic, alicyclic or aromatic nature, for instance the acetylamino, chloracetylamino, propionylamino, phenylacetylamino, hexahydrobenzoylamino, benzoylamino, halogenbenzoylamino, nitrobenzoylamino, aminobenzoylamino, methoxybenzoylamino, phthalylamino and such groups containing still other substituents.

The starting products which I use in the present process can be preferably prepared by condensation of 1,5 - aminohalogenanthraquinone with the aminodiphenyls and subsequent acylation of the condensation products or by condensation of 1 - acylamino-5-halogenanthraquinones with the aminodiphenyls, which can thereupon be subjected to further acylation.

The sulfonation and ring closure can be carried out by stirring, in some cases with cooling, a mixture of the acylamino-5-arylaminoanthraquinone derivative and concentrated sulphuric acid or sulphuric acid monohydrate at a temperature of 0-60° C. Generally it is necessary to add some fuming sulphuric acid or chlorosulfonic acid in order to complete the formation of the water-soluble dyestuffs.

The new dyestuffs can be isolated by pouring the reaction mass on ice and water or on ice and a sodium chloride solution, whereby they precipitate and can be filtered and freed from sulphuric acid by first washing them with a sodium chloride solution. The filter cake thus obtained, when still acid, can be suspended in water or in a dilute sodium chloride solution, neutralized and precipitated by addition of a salt. After drying, the new products are stable powders which are easily soluble in water and can be used for dyeing.

The following examples, without being limitative, illustrate the present invention, the parts being by weight.

Example 1

5 parts of 1-benzoylamino-5-(4'-phenyl)anilido-anthraquinone (obtained by condensation of 1 - benzoylamino - 5 - chloroanthraquinone with p-aminodiphenyl) are dissolved in 25-30 parts of sulphuric acid monohydrate and stirred at 10-25° C. After 1-3 hours 10 parts of 28% fuming sulphuric acid are added thereto and the reaction mass stirred, until a test taken out shows that the dyestuff is water-soluble. It is then isolated in the manner described above, whereupon it dyes wool, silk, leather and nylon in very fast brown shades.

By replacing the p-aminodiphenyl-derivative by the corresponding 4-amino-4'-methyldiphenyl-, 4-amino-4'-chlorodiphenyl- or 4-amino-4'-bromodiphenyl-derivative and working in the manner herein before described, dyestuffs will be obtained which dye animal fibres in similar shades.

Example 2

3 parts of 1-benzoylamino-5-(4'-phenyl)-anilido-anthraquinone are dissolved in 25-30 parts of sulphuric acid monohydrate and stirred for 12 hours at 40-55°C. The dyestuff is then isolated in the usual manner and produces dyeings of the same shades as that of Example 1.

Example 3

3 parts of 1-benzoylamino-5-(4'-phenyl)-anilido-anthraquinone are dissolved in 25 parts of 95-100% sulphuric acid and stirred for several hours at room temperature. Thereupon such a quantity of fuming sulphuric acid is added thereto, that the sulfonation mass contains 5-10% $SO_3$. Then the reaction mixture is stirred at 45°-55° C. until a test has shown that the dyestuff is easily soluble in water. It is isolated in the usual manner and dyes wool in brown shades.

Example 4

5 parts of 1 - benzoylamino - 5 - benzoylbenzidino-anthraquinone (obtained by condensation of 1.5-amino-chloro-anthraquinone with benzidine and subsequent dibenzolylation of the condensation product) are dissolved in 25-30 parts of sulphuric acid monohydrate and stirred for several hours at room temperature. Then 14 parts of 65-70% fuming sulphuric acid are added to the solution mass, heated to 40-55° C. and stirred until a test taken out shows that the dyestuff is soluble in water. After cooling down, the sulfonation mass is poured into a mixture consisting of 100 parts of ice and 100 parts of a 15% sodium chloride solution and filtered. After washing 3-4 times with a 6% sodium chloride solution the filter cake is pasted with sodium carbonate until a slight alkaline reaction is reached, whereupon it is dried. The new dyestuff is a dark powder soluble in water with a yellow-brown coloration and in concentrated sulphuric acid with a blue coloration. It dyes wool, silk, nylon and leather in yellowish-brown shades possessing excellent fastness properties.

By using as starting product 1-acetylamino-5-benzoyl-benzidinoanthraquinone and working as described hereinbefore, a dyestuff will be obtained which dyes animal fibres in yellowish-brown shades of excellent fastness properties.

Example 5

5 parts of 1 - benzoylamino - 5 - benzoylbenzidino-anthraquinone are dissolved in 25 parts of 93-100% sulphuric acid and stirred for several hours at room temperature. Thereupon such a quantity of 65-70% fuming sulphuric acid is added thereto, that the sulfonation mass contains 25-30% $SO_3$. The stirring is continued under heating at 35-55° C. until the sulfonation is finished. The dyestuff isolated in the usual manner dyes silk, wool, nylon and leather in very fast yellowish-brown shades.

The following table shows further starting products which, when treated as described in the above examples, give new valuable carbazol dyestuffs of the anthraquinone series:

| Starting product | Shade of the dyestuff on wool |
|---|---|
| 1-benzoylamino-5-acetylbenzidinoanthraquinone | brown-yellow. |
| 1-m-chlorobenzoylamino-5-p-chlorobenzoyl-benzidinoanthraquinone | yellow-brown. |
| 1-p-chlorobenzoylamino-5-p-chlorobenzoyl-benzidinoanthraquinone | Do. |
| 1-o-chlorobenzoylamino-5-benzoylbenzidinoanthraquinone | Do. |
| 1-m-chlorobenzoylamino-5-benzoylbenzidinoanthraquinone | Do. |
| 1-p-chlorobenzoylamino-5-benzoylbenzidinoanthraquinone | Do. |
| 1-o-bromobenzoylamino-5-benzoylbenzidinoanthraquinone | Do. |
| 1-p-chlorobenzoylamino-5-p-nitrobenzoylbenzidinoanthraquinone | Do. |
| 1-m-chlorobenzoylamino-5-acetylbenzidinoanthraquinone | Do. |
| 1-p-nitrobenzoylamino-5-benzoylbenzidinoanthraquinone | Do. |
| 1-p-nitrobenzoylamino-5-p-nitrobenzoylbenzidinoanthraquinone | Do. |
| 1-p-nitrobenzoylamino-5-o-chlorobenzoylbenzidinoanthraquinone | Do. |
| 1-p-nitrobenzoylamino-5-acetylbenzidinoanthraquinone | Do. |
| 1-chloroacetylamino-5-benzoyl-benzidinoanthraquinone | Do. |
| 1-trichloracetylamino-5-benzoylbenzidinoanthraquinone | Do. |
| 1-benzoylamino-5-benzoyl-o-tolidinoanthraquinone | Do. |
| 1-benzoylamino-5-benzoyl-m-tolidinoanthraquinone | brown. |
| 1-benzoylamino-5-(benzoyldianisidino)-anthraquinone | Do. |

What I claim is:

1. A process for the manufacture of acid dyestuffs of the anthraquinone carbazol series comprising the step of treating an anthraquinone compound of the general formula

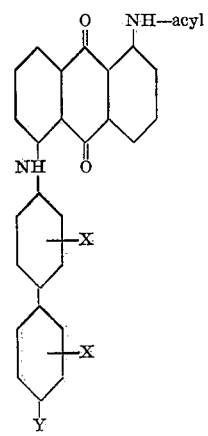

wherein X stands for a substituent selected from the group consisting of hydrogen, halogen, alkyl and alkoxy and Y stands for a substituent selected from the group consisting of hydrogen, alkyl, halogen and acylamino, each said acyl being carboxylic acid acyl, with a sulfonating agent at a temperature of 0-60° C.

2. A process for the manufacture of a dyestuff of the anthraquinone carbazol series comprising the step of treating 1-benzoylamino-5-(4'-phenyl)anilido-anthraquinone with sulphuric acid monohydrate at a temperature of 10-55° C. until it becomes soluble in water.

3. A process for the manufacture of a dyestuff of the anthraquinone carbazol series comprising the step of treating 1-benzoylamino-5-benzoylbenzidinoanthraquinone with sulphuric acid containing free $SO_3$ at a temperature of 40-55° C. until it becomes soluble in water.

4. A process for the manufacture of a dyestuff of the anthraquinone carbazol series comprising the step of treating 1-acetylamino-5-benzoylbenzidinoanthraquinone with sulphuric acid containing free $SO_3$ at a temperature of 40-55° C. until it becomes soluble in water.

5. The sulfonated dyestuffs deriving from an anthraquinone carbazol compound of the general formula

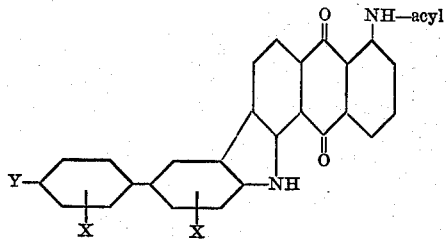

wherein X stands for the substituent selected from the group consisting of hydrogen, halogen, alkyl and alkoxy and Y stands for a substituent selected from the group consisting of hydrogen, alkyl, halogen and acylamino, each said acyl being carboxylic acid acyl, which dyestuffs possess one to three sulfonic acid groups and which are soluble in concentrated sulphuric acid with a blue coloration and dye animal fibres, leather and superpolyamides in brown-yellow to brown shades.

6. The anthraquinone carbazol dyestuff of the formula

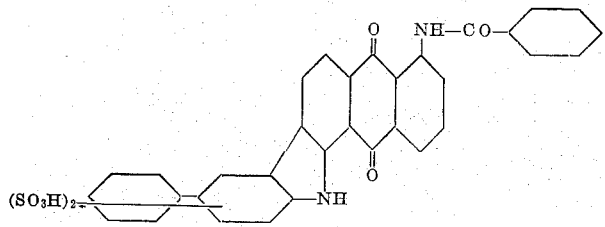

7. The anthraquinone carbazol dyestuff of the formula

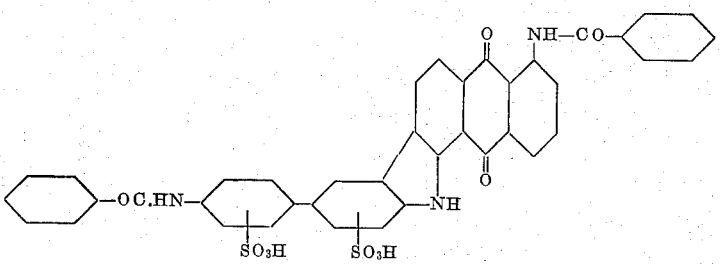

8. The anthraquinone carbazol dyestuff of the formula

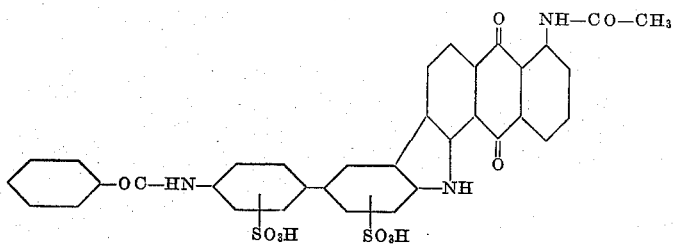

ERNST GUTZWILLER.

REFERENCES CITED

The following references are of record in the file of this patent:

UNITED STATES PATENTS

| Number | Name | Date |
|---|---|---|
| 1,877,791 | Bayer | Sept. 20, 1932 |
| 2,113,231 | Deinet | Apr. 5, 1938 |
| 2,149,064 | Mieg | Feb. 28, 1939 |

FOREIGN PATENTS

| Number | Country | Date |
|---|---|---|
| 160,346 | Switzerland | May 1, 1933 |